Inventor
WILLIAM CHARLES REED
JACK SILBERMAN
By
Jacob Jacobs
Attorney

United States Patent Office 3,500,182
Patented Mar. 10, 1970

3,500,182
APPARATUS FOR AND A METHOD OF HIGH FREQUENCY ELECTROMAGNETIC MOISTURE MEASUREMENT IN HIGHLY VISCOUS PASTES AND SIMILAR MATERIALS
William C. Reed, Whitley Bay, and Jack Bilbrough, Newcastle-upon-Tyne, England, assignors to The Rank Organisation Limited, London, England, a company of Great Britain and Northern Ireland
Filed June 21, 1966, Ser. No. 559,155
Claims priority, application Great Britain, June 25, 1965, 27,148/65
Int. Cl. G01f 27/04
U.S. Cl. 324—58.5                                  11 Claims

ABSTRACT OF THE DISCLOSURE

The moisture content of a flow of viscous material is measured by passing high frequency electromagnetic signals therethrough, the material being constrained to flow through a chamber or conduit which has a part of its cross-sectional area subdivided by a pair of opposed boundary plates extending edge-on in the direction of material movement and which form a confining guide path for the signals that are led to and from the path through end boundary means impervious to the flowing material, the signals being evaluated after traversing the material in said path to determine the moisture content thereof. An apparatus thereof and a method thereof are described. The signal path as defined by these boundary plates has a length independent of the cross-sectional area provided for the fluid flow whereby the degree of anticipated signal attenuation can be controlled.

---

Figure 1:
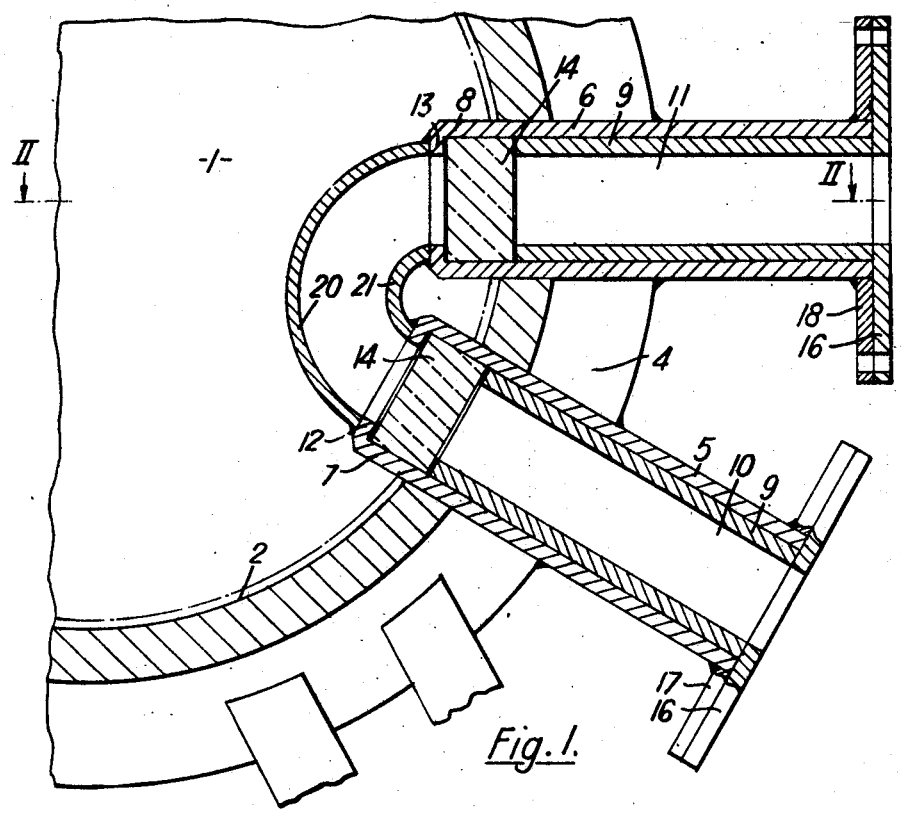

It is known that a highly viscous material, particularly one containing moisture, will, when placed in a waveguide, or in a path of high frequency electromagnet signals, cause attenuation or loss of signal due to the presence of water.

An object of this invention is to provide means enabling the continuous measurement of the moisture content of a viscous material in passing through processing equipment, such as equipment in which constituents of a product are under displacement for mixing, kneading or similar mechanical treatment in order to improve the homogeneity of the finished product. For example, the invention is applicable to equipment, used in the manufacture of soap, wherein a partly treated soap base is passed into a chamber at high pressure to be extruded through small holes in one wall of the chamber, the extrusions being cut into small portions for further mixing.

The invention provides a method of measuring the moisture content of a flow of viscous material by passing high frequency electromagnetic signals therethrough, wherein the material is constrained to flow through a chamber or conduit which has a part of its cross-sectional area subdivided by a pair of opposed boundary plates extending in the direction of material movement and which form a confining guide path for the high frequency electromagnetic signals that are led to and from said path through end boundary means imprevious to the flowing material, said signals being evaluated after traversing the material in said path to determine the moisture content thereof.

The invention further provides apparatus for measuring the moisture content of a viscous material flowing through an enclosed conduit or chamber, comprising a pair of equidistantly arranged plates located edge-on to the material flow direction to bound part of the cross-sectional area of said conduit and so define a guide path within said conduit for high-frequency electromagnetic signals, waveguide means being provided for the injection of said signals into said path and for the reception of the signals after passage therealong, sealing means being provided between said waveguide means and the interior of the condiut preventing flow of the viscous material through said means but permitting the passage of the signals to and from the guide path.

One of the waveguides is connectable to a source of high frequency electromagnetic signals, and the other is connectable to means for measuring the signals emerging from said path in the chamber.

The two plates may be plane and located in parallel disposition so as to extend across the chamber and connect either two mutually aligned waveguides mounted in the wall or walls of the chamber for measurement by transmission or else one such waveguide and an opposed reflecting surface for measurement by reflection. Where an arrangement of measurement by transmission is employed, the respective waveguides may, for example, be mounted in mutual alignment in two walls of a rectangular or other polygonal chamber, or in diametrical opposition in the wall of a cylindrical chamber, or a chord of such cylindrical chamber so that one of the plates is farther than the other from a diametrical plane of the chamber.

Alternatively, the plates may be curved. For example, in one arrangement for measurement by transmission they may be part cylindrical and concentric with their ends connected to two waveguides aligned with said ends and mounted peripherally adjacent either radially in the wall of a cylindrical chamber, or both in one plane wall of a chamber, or one in each of two non-parallel plane walls of a chamber.

Over at least a part of its lentgh the guide path may be directed obliquely through the chamber or conduit. Usually, however, the or each sealing means will be disposed in or adjacent the wall of the chamber or conduit with its inner face substantially parallel to the surrounding region of the wall. By this means, disturbance of the material flow is minimised.

Figure 2:
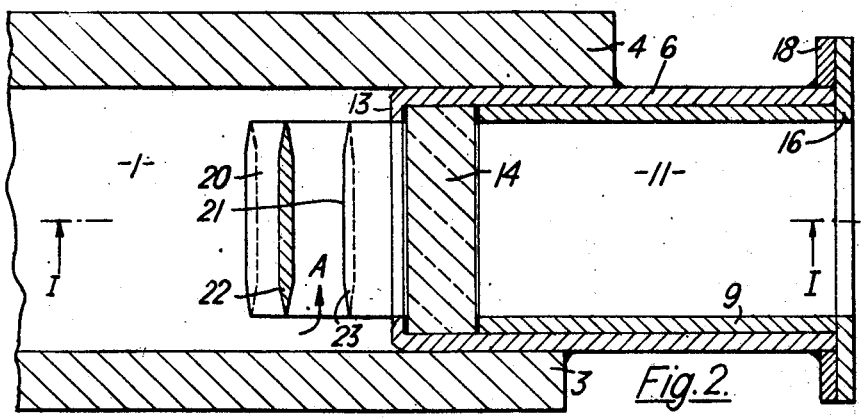
Figure 5:
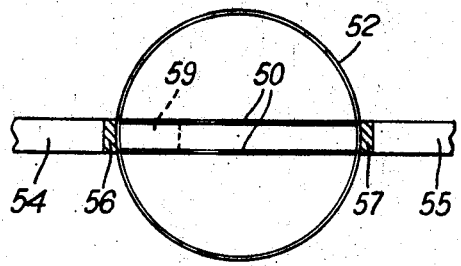
Figure 6:
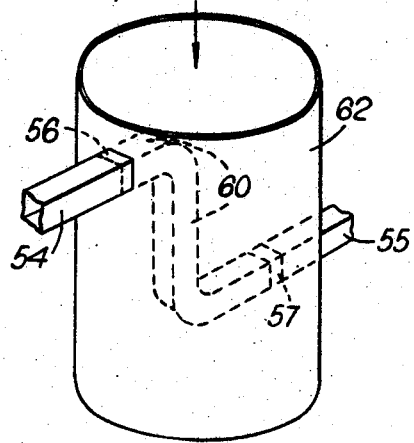
Figure 7:
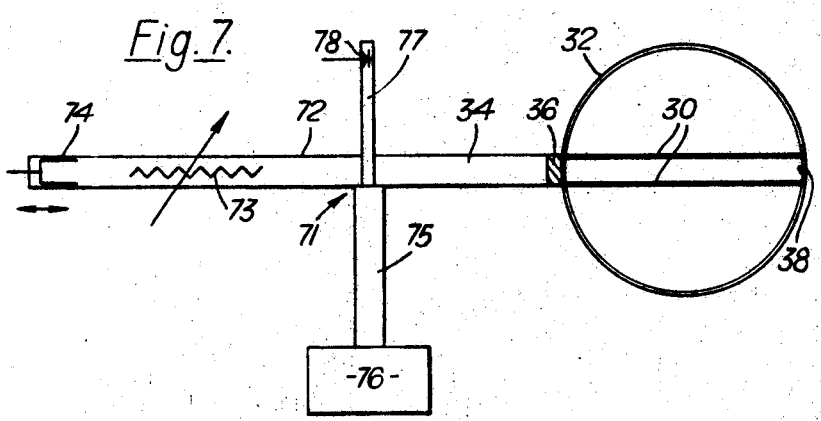
Figure 8:
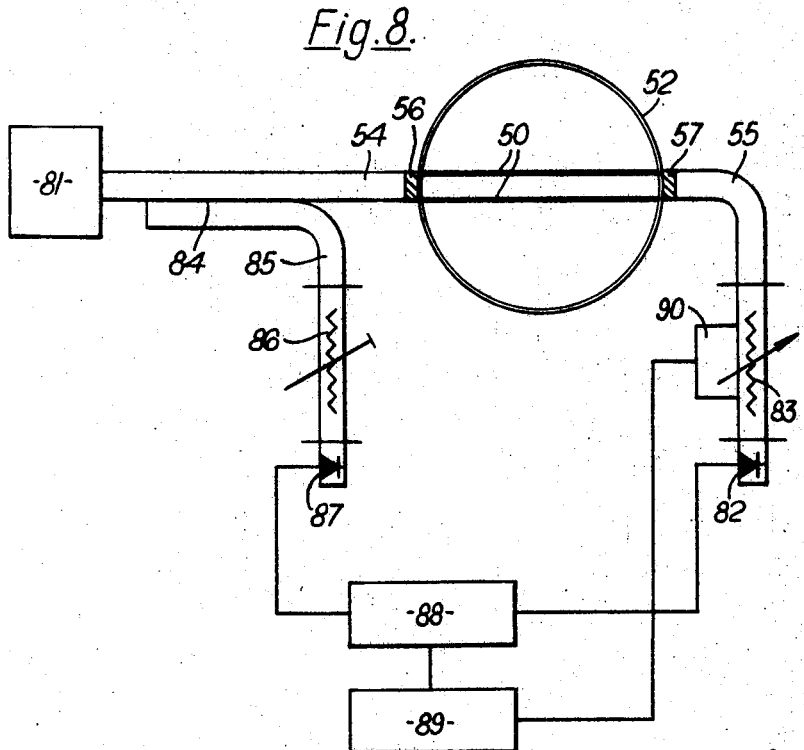

The invention will be more particularly described with reference to the accompanying drawings, wherein:

FIG. 1 is a transverse section of a portion of a cylindrical chamber showing means according to the invention mounted therein, FIG. 2 is a radial section on the line II—II of FIGURE 1, FIGS. 3 to 6 show in diagrammatic form alternative arrangements for guiding monitoring signals through a flow of material, and FIGS. 7 and 8 show in diagrammatic form two alternative circuits that can be employed to derive the required measurement signals.

Referring more particularly to FIGS. 1 and 2 of the drawings, a shallow cylindrical chamber 1, of which a portion is shown in the drawings, is used in the manufacture of soap, and is known as a plodder, and comprises a cylindrical wall 2 secured between discs 3 and 4. A partly treated soap base in the form of a viscous paste is introduced through the plate 3 and discharged through apertures (not shown) in the plate 4 under high pressure. The direction of displacement is parallel to the axis of the cylindrical wall 2.

Means for facilitating continuous measurement of the moisture content of the material under displacement consists of a pair of waveguide casings 5 and 6, rectangular in section, and secured radially between the discs 3 and 4 so that their inner ends 7 and 8 penetrate the wall 2. The waveguides have rectangular liners 9 which afford passages 10 and 11 of rectangular section, narrower as seen in FIGURE 1 and wider as seen in FIGURE 2. At the inner ends of the waveguides there are provided inturned shoulders 12 and 13 to serve as abutments, with the interposition of suitable packing, for example of lead, for sealing elements 14, which are transparent to electromagnetic radiation; these elements may for example be made of quartz, or a quartz glass, or a suitable plastics material. The sealing elements are held against the shoulders 12 and 13 by the liners 9, which in turn are maintained in position by discs 16, with rectangular apertures, these discs being secured against flanges 17, 18, on the waveguide casings.

Within the chamber 1 there are welded to the inner surfaces of the shoulders 12 and 13 on the waveguides, two part cylindrical plates 20 and 21, which are concentric and spaced apart by a distance equal to the narrower dimension of the passages 10 and 11. The plates 20 and 21 define a guide path to divert electromagnetic signals introduced by way of one of the waveguide channels smoothly so that they emerge through the other channel, the ends of the plates 20 and 21 being parallel to the radial planes upon which the waveguides are located.

Apart from the plates 20 and 21 the path for the signals has no solid boundaries, that is to say it is open towards the discs 3 and 4 of the plodder device, so that material can flow in a direction parallel to the axis between these plates 20 and 21. Those edges 22, 23 of the plates, towards which the viscous material moves as shown by the arrow A, FIGURE 2, are preferably bevelled as indicated to facilitate entry of the material into the passage between the plates. A similar bevel can be given to the trailing edges of the plates.

A device for producing high frequency electromagnetic signals may be connected to the flange of one of the waveguides, while a device for metering the emergent signals is connected to the flange of the other device. According to the moisture content of the material passing through the open-ended passage between the plates 20 and 21, the signals will be attenuated, and attenuation is measured by the metering device. The sealing elements 14, 15 being transparent to electromagnetic radiation do not affect the signals passing through them but they prevent extrusion through the waveguide channels of the viscous material under pressure in the chamber 1.

Some alternative arrangements of the guide path are shown diagrammatically in FIGS. 3 to 6 of the drawings.

Figure 3:
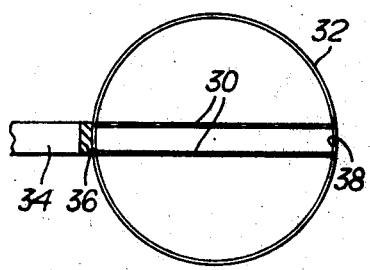

In FIG. 3, parallel plates 30 extend across conduit 32 from a waveguide 34 and sealing element 36 to define a diametric guide path. Where the plates meet the inner wall of the conduit remote from the waveguide 34 a reflecting surface 38 for the signals is formed so that the signals are returned to the waveguide for evaluation. The viscous material of course flows axially of the conduit and between the plates 30.

Figure 4:
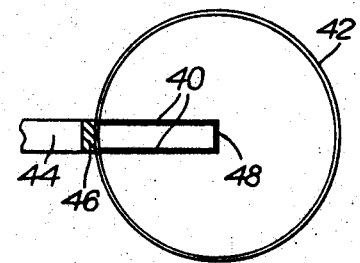

FIG. 4 illustrates another construction for measurement by reflection. The parallel plates 40 extend from waveguide 44 and sealing element 46 to terminate short of the opposite boundary wall of the conduit 42 and a reflecting wall 48 for return of the signals is formed by a plate fixed to and carried by the plates 40.

FIGS. 5 and 6 show two arrangements for measurement by transmission in analogy to the arrangement in FIG. 1; it should be appreciated, however, that the addition of a reflecting wall to the outlet waveguide is all that is required to adapt any of these arrangements for measurement by reflection.

In FIG. 5 the parallel plates 50 extend diametrically across the conduit or chamber 52 between respective waveguides 54, 55 and sealing elements 56, 57. This also happens in the arrangement of FIG. 6 where similar parts have the same reference numbers but here the ends of the plates 60 are axially spaced along the conduit or chamber 62. It will be appreciated that a similar axial spacing could be applied to the curved plate arrangement shown in FIGS. 1 and 2 if desired.

In all the illustrated examples, the sealing elements between the waveguides and the parallel plates have been shown at or adjacent the inner wall of the conduit or chamber and in a plane parallel to the surrounding region of the wall. This latter condition is helpful in minimising disturbance to the flow of the viscous material although in such arrangements as that shown in FIG. 6 it means that the parallel plates 60 must be given a double crank or Z-form.

In certain circumstances it may be desired not to use the whole length of the parallel plates in the conduit or chamber to receive the material being measured. In such cases, the space between the plates can be filled by a plug of dielectric material over a part of their length, as indicated at 59 in FIG. 5, this plug preferably being given a streamlined surface contour to minimise disturbance of the viscous material flow. It is also preferred that the dielectric material should be formed as an extension from a sealing element, as is the case in FIG. 5.

Examples of the circuits that can be used for measurement by reflection and by transmission are shown in FIGS. 7 and 8 which illustrate such circuits applied to the arrangements of FIGS. 3 and 5 respectively.

In FIG. 7, waveguide 34 forms one of the co-axial arms of a magic T 71, the other co-axial arm 72 of which forms a reference waveguide in which is positioned a variable attenuator 73 and a variable short circuit 74. One transverse arm 75 of the magic T is coupled to a microwave generator 76 and the other transverse arm 77 contains a crystal detector 78.

In operation, microwave energy from the generator 76 is fed to the magic T, part travelling along the waveguide 34 into the guide path formed by the plates 30 and being reflected from the surface 38 to re-enter the waveguide 34; another part of the energy from the generator branch 75 passes along the waveguide 72 and is reflected from the short circuit 74. Standing waves are thus set up, on the one hand, in the path formed by the waveguide 34 and plates 30 and, on the other hand, in the waveguide 72. The reflected waves reach the magic T 71 and interfere to produce waves in the branch 77 having a power equal to the difference between the powers of the reflected waves. A signal is thus generated in the detector 78 in dependence upon this power difference.

If the attenuation in the waveguide 72 is kept at a set value then the difference signal from the detector 78 can be used to give a direct indication of the attenuation occurring between the plates 30 and thus of the moisture content of material flowing through the conduit 32. Alternatively, the detector output may be connected to a servo system producing a mechanical output for varying the setting of the attenuator 73 so as to maintain the system in balance, i.e. to keep the detector output at a value approacting zero. In such a system the mechanical output of the servo control can be used to indicate the attenuation occurring between the plates 30.

Referring now to FIG. 8, signals from microwave source 81 are transmitted by the waveguide 54 through the guide path formed by the plates 50 spanning the conduit 52. An exit waveguide 55 leads the transmitted signal to a crystal detector 82 before which there is interposed a variable attenuator 83. Connected to the input waveguide 54 by a directional coupler 84 is a reference waveguide 85 in which there is a level set attenuator 86 and a crystal detector 87. The outputs of the two detectors are fed to a balance amplifier 88 where they are compared to produce a difference signal as an output to a control amplifier 89 which may incorporate a recorder. The electrical output from the controller amplifier is then directed to a servomechanism 90 controlling the attenuation level of the attenuator 83.

In this embodiment, the balance amplifier 88 continuously compares a reference signal fed from the source 81 by the waveguide 85 with a signal that has been directed through the conduit or chamber 52 to the waveguide 55.

When material is fed through the conduit, the attenuator 83 is therefore adjusted automatically by the control amplifier 89 to maintain the signal ratio of the detectors 82, 87 constant at a preset value constant at a preset value. The level set attenuator 86 may be used for calibration to vary the zero or quiescent setting of the variable attenuator 83.

What we claim and desire to protect by Letters Patent is:

1. Apparatus for measuring the moisture content of a viscous material flowing through an enclosed conduit or chamber, comprising a pair of equidistantly disposed plates disposed edge-on to the material flow direction to bound part of the cross-sectional area of said conduit and so define a guide path within said conduit for high-frequency electromagnetic signals, waveguide means for the injection of said signals into said path and for the reception of the signals after passage therealong, and sealing means between said waveguide means and the interior of the conduit preventing flow of the viscous material through said means but permitting the passage of the signals to and from the guide path.

2. Apparatus according to claim 1 wherein respective waveguides are disposed at axially spaced locations on said conduit or chamber enclosure, the pair of plates extending between said locations and respective sealing means are disposed between the path formed by the plates and the interior of the waveguide at each location.

3. Apparatus according to claim 1 wherein respective waveguides are disposed at spaced locations on said conduit or chamber enclosure, the pair of plates extending between said locations and respective sealing means are disposed between the path formed by the plates and the interior of the waveguide at each location, and further comprising an electromagnetic signal generator and a detector connected to the respective waveguides and balance means connected between said generator and detector to adjust the detector output to a reference value, whereby the setting of said balance means provides the required measurement.

4. Apparatus according to claim 3 comprising a reference waveguide, a directional coupler connecting said waveguide to the signal input waveguide, a comparison unit connected to the circuit to receive reference signals from the reference waveguide and output signals from the signal output detector, a variable attenuator in the output waveguide to said detector adjustable to maintain the reference and detector signals at a constant ratio.

5. Apparatus according to claim 1 wherein a waveguide communicates with one end of the guide path through said sealing means, a reflecting wall is disposed at the other end of said guide path, whereby the signals are returned to said waveguide after transmission through the material.

6. Apparatus according to claim 5 wherein the reflecting wall is secured to and is carried by the parallel plates.

7. Apparatus according to claim 5 further comprising a magic T, one arm of said T forming the waveguide communicating with the guide path and a further arm co-axial to said one arm forming a reference waveguide, a pair of transverse arms further included in the magic T and an electromagnetic signal generator and a detector being provided in the respective transverse arms.

8. Apparatus according to claim 1 wherein respective waveguides are disposed at spaced locations on said conduit or chamber enclosure, and the pair of plates extending between said locations and respective sealing means is disposed between the path formed by the plates and the interior of the waveguide at each location.

9. Apparatus according to claim 8, wherein said waveguides and sealing means are disposed at peripherally adjacent locations on said conduit enclosure and said plates define a curved path between said locations.

10. Apparatus according to claim 5 wherein an inner surface of said conduit forms a boundary for said material and also defines said reflecting wall, and the parallel plates extend across the conduit thereto from said waveguides.

11. Apparatus for measuring the moisture content of a viscous material flowing through an enclosed conduit or chamber, comprising a pair of equidistantly disposed plates disposed edge-on to the material flow direction to bound part of the cross-sectional area of said conduit and so define a guide path within said conduit for high-frequency electromagnetic signals, a solid dielectric material is disposed in the space between the plates over a portion of their length to reduce the signal path length on the flowing material, waveguide means for the injection of said signals into said path and for the reception of the signals after passage therealong, and sealing means between said waveguide means and the interior of the conduit preventing flow of the viscous material through said means but permitting the passage of the signals to and from the guide path.

References Cited

UNITED STATES PATENTS

| | | | |
|---|---|---|---|
| 2,798,197 | 7/1957 | Thurston | 324—58.5 |
| 3,034,046 | 5/1962 | Sasaki | 324 58.5 |
| 3,265,873 | 8/1966 | Sawyer | 324—58.5 X |

ARCHIE R. BORCHELT, Primary Examiner

P. F. WILLE, Assistant Examiner